(12) United States Patent
Lee et al.

(10) Patent No.: US 7,011,502 B2
(45) Date of Patent: Mar. 14, 2006

(54) THERMAL SHIELD TURBINE AIRFOIL

(75) Inventors: Ching-Pang Lee, Cincinnati, OH (US); Ronald Scott Bunker, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 77 days.

(21) Appl. No.: 10/824,922

(22) Filed: Apr. 15, 2004

(65) Prior Publication Data

US 2005/0232769 A1    Oct. 20, 2005

(51) Int. Cl.
*F01D 5/18* (2006.01)
(52) U.S. Cl. .................................... 416/97 R
(58) Field of Classification Search ............. 416/97 R; 415/115
See application file for complete search history.

(56) References Cited

U.S. PATENT DOCUMENTS

| | | | |
|---|---|---|---|
| 3,819,295 A | 6/1974 | Hauser et al. | |
| 4,026,659 A * | 5/1977 | Freeman, Jr. | 415/115 |
| 4,407,632 A | 10/1983 | Liang | |
| 4,565,490 A * | 1/1986 | Rice | 415/114 |
| 4,859,147 A * | 8/1989 | Hall et al. | 416/97 R |
| 5,370,499 A | 12/1994 | Lee | |
| 5,690,472 A | 11/1997 | Lee | |
| 5,720,431 A | 2/1998 | Sellers et al. | |
| 5,827,045 A * | 10/1998 | Beeck | 416/96 A |
| 5,931,638 A | 8/1999 | Krause et al. | |
| 6,254,334 B1 | 7/2001 | LaFleur | |
| 6,514,042 B1 | 2/2003 | Kvasnak et al. | |

* cited by examiner

*Primary Examiner*—Edward K. Look
*Assistant Examiner*—Nathan Wiehe
(74) *Attorney, Agent, or Firm*—William S. Andes; Francis L. Conte

(57) ABSTRACT

A turbine airfoil includes opposite pressure and suction sides joined together at leading and trailing edges. An outwardly convex nose bridge bridges the pressure and suction sides behind the leading edge, and is integrally joined to a complementary thermally insulating shield spaced therefrom to define a bridge channel. The shield includes the leading edge and wraps laterally aft around the nose bridge along both the pressure and suction sides.

22 Claims, 2 Drawing Sheets

THERMAL SHIELD TURBINE AIRFOIL

The U.S. Government may have certain rights in this invention pursuant to contract number F33615-02-C-2212 awarded by the U.S. Department of the Air Force.

BACKGROUND OF THE INVENTION

The present invention relates generally to gas turbine engines, and, more specifically, to turbines therein.

In a gas turbine engine air is pressurized in a compressor and mixed with fuel in a combustor for generating hot combustion gases. Energy is extracted from the gases in a high pressure turbine which powers the compressor, and additional energy is extracted in a low pressure turbine which typically powers an upstream fan in a typical turbofan aircraft engine application.

Engine efficiency and performance can be increased by increasing temperature of the combustion gases, but the hot combustion gases affect the life of turbine components heated thereby. Typical components such as nozzle vanes and rotor blades in the turbines are bathed with the hot combustion gases during operation and are typically cooled for prolonging their useful life in the engine.

For example, pressurized air is suitably bled from the compressor and channeled to the stationary nozzle vanes and rotating turbine rotor blades during operation for cooling thereof. The vanes and blades have correspondingly shaped hollow airfoils with internal cooling circuits therein.

Turbine airfoil cooling is quite esoteric and quite sophisticated, and the prior art is replete with a myriad of patents for maximizing cooling performance of the cooling air in the various regions of the airfoils.

The typical airfoil has a generally concave pressure side and generally convex suction side joined together at axially spaced apart leading and trailing edges. The airfoil extends from a radially inner root to a radially outer tip. For a turbine blade, the root is integral with a blade platform and the tip is spaced inwardly from a surrounding shroud. For a nozzle vane, both the root and the tip are integrally joined with corresponding inner and outer bands.

Inside the airfoil may be several cooling circuits with various configurations which typically discharge the cooling air through rows of film cooling holes in the pressure and suction sides of the airfoil. The cooling circuits include radial flow channels, some of which may be arranged end-to-end in serpentine fashion extending toward the leading edge of the airfoil or its trailing edge.

Small turbulator ribs may be formed on the inner surfaces of the airfoil for increasing heat transfer. Impingement cooling holes may be provided in corresponding bridges for impingement cooling the inner surface of the airfoil, typically at the hot leading edge. And, arrays of pins may be configured in two dimensional mesh grids for enhancing heat transfer cooling inside the airfoils.

Various patents in the prior art disclose typical embodiments of mesh cooling. Further advances in mesh cooling are presently being developed and are found, for example, in U.S. patent application Ser. No. 10/616,023 filed Jul. 9, 2003 now U.S. Pat. No. 6,832,889; Ser. No. 10/692,700 filed Oct. 24, 2003; and Ser. No. 10/718,465 filed Nov. 20, 2003, all assigned to the present assignee.

The various forms of cooling features in turbine airfoils are in many cases relatively small and must be capable of practical manufacture. For example, typical turbine airfoils are made by casting typical superalloy metals using corresponding ceramic cores which define the internal flow passages of the airfoil. The various impingement cooling holes, turbulator ribs, and mesh pins may be integrally formed in the cast airfoil by using corresponding features in the ceramic core or cores.

The individual radial passages in the turbine airfoil are formed by a corresponding ceramic core in the form of a slender leg or finger. The ceramic cores are relatively brittle and subject to damage during the casting process. If the cores are too thin or weak and prone to breakage, the effective yield of the casting process is reduced which correspondingly increases casting cost.

Following the casting process, the various rows of film cooling holes in their various simple to complex configurations may be formed using suitable drilling processes including laser drilling or electrical discharge machining (EDM) for example.

Since the leading edge region of the turbine airfoils first receives the hot combustion gases which flow thereover during operation, they are typically subject to the highest heat loads during operation and therefore require maximum cooling capability. Leading edge cooling configurations are myriad in the prior art.

Maximum leading edge cooling may be typically effected by providing impingement cooling directly behind the leading edge, and including several rows of showerhead film cooling holes through the leading edge for discharging the spent impingement cooling air in thermally insulating films over the external surface of the airfoil.

Aft of the leading edge in the suction side of the airfoil is typically found a row of film cooling gill holes for re-initiating the cooling film aft therefrom. And, aft of the leading edge on the pressure side are also found several rows of film cooling holes for re-initiating the cooling air films downstream therefrom.

In view of the typical complexity in effectively cooling the leading edge region of turbine airfoils, it is desired to provide an airfoil having improved leading edge cooling which may be introduced using conventional casting processes.

BRIEF DESCRIPTION OF THE INVENTION

A turbine airfoil includes opposite pressure and suction sides joined together at leading and trailing edges. An outwardly convex nose bridge bridges the pressure and suction sides behind the leading edge, and is integrally joined to a complementary thermally insulating shield spaced therefrom to define a bridge channel. The shield includes the leading edge and wraps laterally aft around the nose bridge along both the pressure and suction sides.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
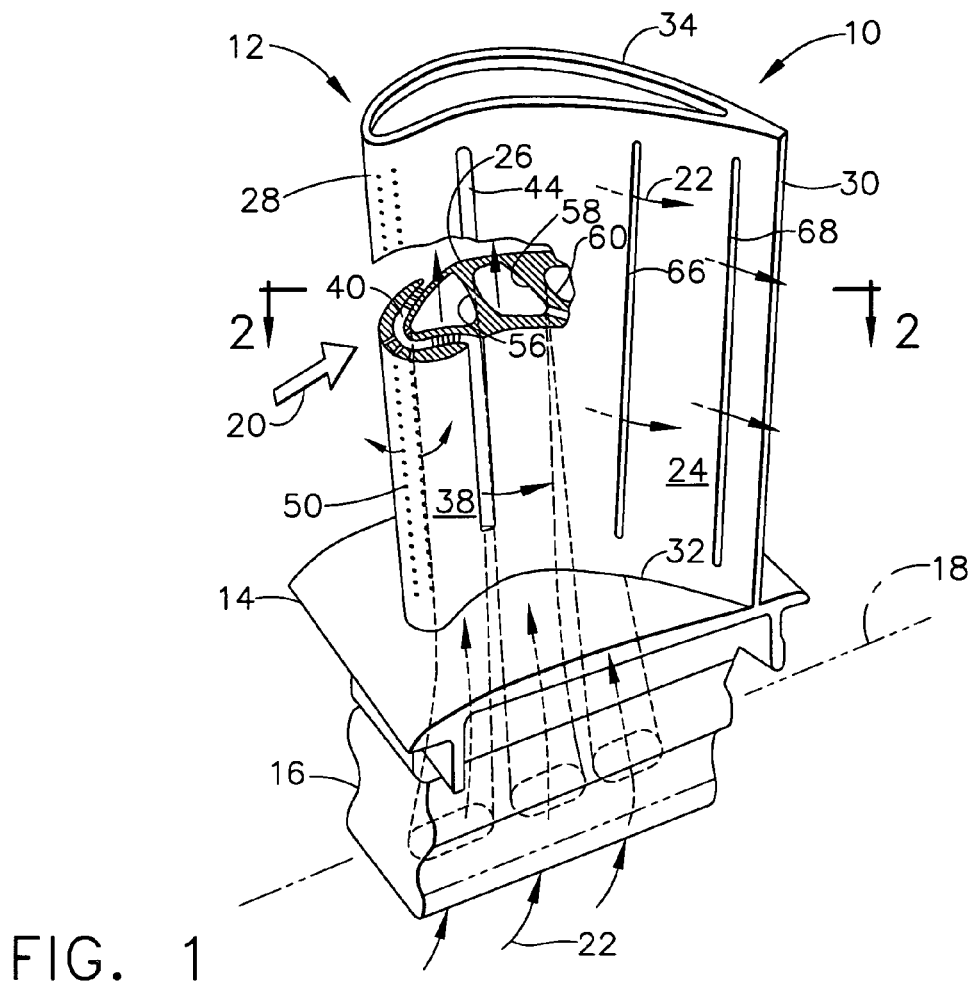
FIG. 1 is a partly sectional elevational view of an exemplary gas turbine engine turbine rotor blade having a leading edge thermal shield.

Illustrated in FIG. 1 is an exemplary turbine rotor blade 10 for a gas turbine engine, such as a turbofan aircraft engine. The blade includes an airfoil 12 of suitable shape integrally formed with a platform 14 and supporting dovetail 16 in a unitary configuration.

The dovetail 16 is conventional and includes axial tangs or lobes which are trapped in a complementary axial dovetail groove in the perimeter of a supporting rotor disk (not shown) in the turbine engine. The axial centerline axis 18 of the turbine engine is illustrated for point of reference, with the exemplary dovetail being configured for axial entry into the corresponding dovetail slot. A full row of the blades 10 are mounted around the perimeter of the disk in the engine.

During operation, hot combustion gases 20 are generated in the combustor (not shown) of the engine and suitably channeled to the row of turbine rotor blades through a conventional turbine nozzle (not shown) having a row of stator vanes mounted between radially outer and inner bands. Pressurized air 22 is bled from the compressor (not shown) of the engine and suitably delivered to the base of the dovetail 16 for flow inside the hollow airfoil for cooling thereof.

Figure 2:
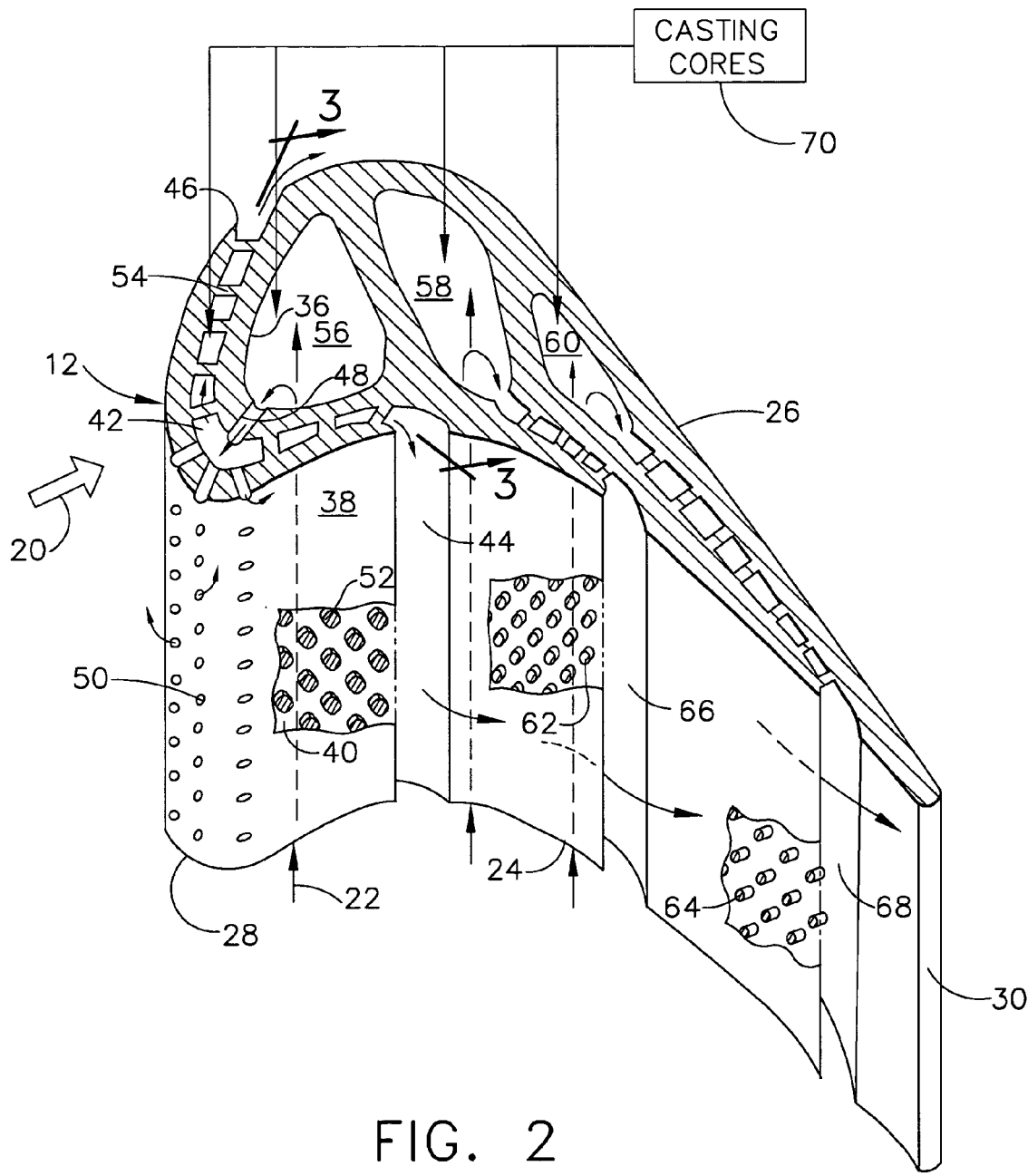
FIG. 2 is an isometric view of a portion of the turbine airfoil illustrated in FIG. 1 and taken along line 2—2.

More specifically, the airfoil 12 includes circumferentially or laterally opposite pressure and suction sides 24,26 as illustrated in more detail in FIG. 2. The two sides are joined together at axially or chordally spaced apart leading and trailing edges 28,30, and extend radially or longitudinally from a root 32 at the platform 14 to a radially outer tip 34 as shown in FIG. 1.

The exemplary airfoil 12 illustrated in FIGS. 1 and 2 may have any suitable configuration for channeling the combustion gases 20 thereover during operation and extracting energy therefrom for rotating the supporting disk and powering the compressor rotor. The airfoil is hollow and includes improved cooling features as further described hereinbelow, which features may also be used in the stator vanes of the turbine nozzle if desired.

More specifically, the airfoil illustrated in FIG. 2 includes an outwardly convex prow or nose partition or bridge 36 which extends integrally between the pressure and suction sides directly behind the leading edge 28 of the airfoil. The nose partition bridges the opposite sides of the airfoil in the leading edge region and is integrally joined to a complementary, inwardly concave thermally insulating leading edge shield 38. The thermal shield is spaced chordally forward from the nose bridge to define a corresponding bridge flow channel 40 therebetween.

The shield 38 itself includes the leading edge 28 and wraps laterally aft around the nose bridge 36 along both the pressure and suction sides. The shield and bridge define a double wall construction for the leading edge portion of the airfoil, with the bridge channel 40 providing a thermally insulating void or space therebetween.

As best shown in FIG. 2, the shield 38 is inwardly concave or curved in each radial section of the airfoil opposite to the outwardly convex curvature of the nose bridge 36. Correspondingly, the bridge channel 40 includes a complementary common inlet 42 in the form a longitudinal or radial channel disposed between the shield and nose bridge behind the leading edge. The bridge channel also includes laterally opposite first and second slot outlets 44,46 extending longitudinally along the corresponding pressure and suction sides 24,26 of the airfoil.

The nose bridge 36 is preferably perforate longitudinally along the bridge channel inlet 42 and includes one or more longitudinal rows of impingement holes 48 directed substantially normal or perpendicular to the shield behind the leading edge 28 for impingement cooling thereof. A particular advantage of the convex nose bridge and complementary, concave thermal shield 38 along the leading edge of the airfoil is the corresponding reduction in spacing therebetween.

In this way, the impingement air 22 is discharged from the impingement holes 48 directly against the inner surface of the thermal shield behind the leading edge with a relatively short distance therebetween for maximizing performance of the impingement air with minimal loss in velocity thereof prior to impacting the shield.

The shield 38 is preferably perforate longitudinally along the leading edge 28 and includes, for example, three longitudinal rows of film cooling holes 50 along the leading edge for film cooling thereof. The film cooling holes 50 are arranged closely together in a conventional manner for effecting a showerhead distribution of the film cooling holes for providing a thermally insulating film of cooling air along the airfoil leading edge and aft therefrom along both sides of the airfoil.

The leading edge 28 of the airfoil is therefore protected externally by the film of cooling air discharged from the showerhead holes 50, and internally cooled by impingement from the cooling air discharged from the row of impingement holes 48. Furthermore, the spent impingement air is also discharged laterally through the bridge channel 40 towards the two opposite slot outlets 44,46 for continuing the thermal insulation behind the thermal shield and enhancing cooling effectiveness of the leading edge region of the airfoil.

The shield 38 is integrally joined to the nose bridge 36 by one or more two dimensional arrays of mesh pins 52,54 arranged in a two dimensional mesh in the bridge channel 40. In mesh cooling, the pins are arranged in longitudinally offset rows to provide circuitous flowpaths in the bridge channel between the two walls thereof for increasing heat transfer of the cooling air being channeled therethrough.

One array of first pins 52 is arranged in a first mesh along the pressure side 24 of the airfoil from the bridge channel inlet 42 and terminates at the pressure side first slot outlet 44 of the bridge channel. An array of second pins 54 is arranged in a second mesh along the suction side 26 of the airfoil from the common inlet 42, and terminates at the second slot outlet 46 of the bridge channel.

Figure 3:
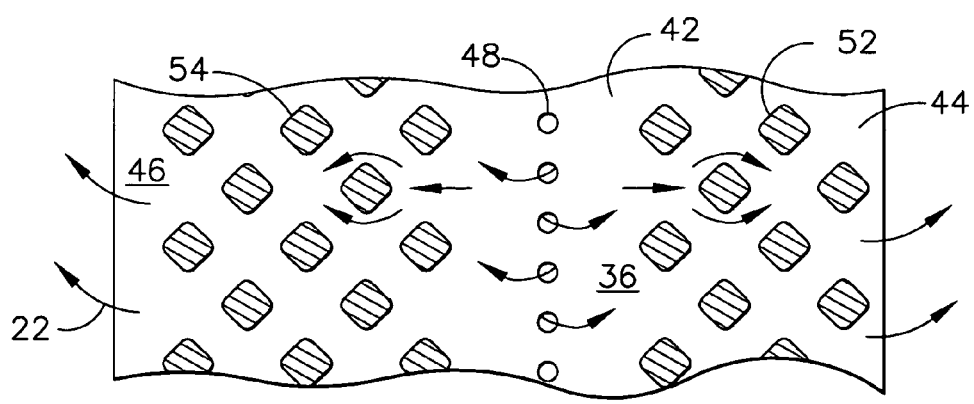
FIG. 3 is an planiform view of a bridge channel behind the thermal shield illustrated in FIG. 2, and taken generally along line 3—3.

In this way, a portion of the spent impingement air collected in the bridge inlet channel 42 is distributed laterally aft through the pressure and suction side arrays of mesh pins for enhancing cooling of the thermal shield itself and further protecting the leading edge region of the airfoil during operation. FIG. 3 illustrates in more detail the lateral distribution of the spent impingement air 22 as it flows from the common bridge channel inlet 42 laterally aft toward the opposite first and second side outlets 44,46.

The first and second mesh pins 52,54 may have any suitable configuration such as the square or diamond shaped configurations illustrated in FIGS. 2 and 3. Any alternate shape thereof may also be used, such as cylindrical pins, with various size and spacing to tailor local heat transfer and structural strength.

In the preferred embodiment illustrated in FIG. 2, the opposing convex and concave surfaces of the nose bridge and shield are generally parallel with each other at the bridge inlet, and the bridge channel 40 converges chordally aft between the common inlet 42 and the two side outlets 44,46. In this way, as the spent impingement air 22 migrates towards the two opposite outlets 44,46, the velocity of the air may increase for increasing its heat transfer rate as the air absorbs heat along its flowpath.

A longitudinal first inlet channel 56 is preferably disposed directly behind the nose bridge 36 as illustrated in FIG. 2 and extends through the platform and dovetail, with a corresponding first inlet at the base of the dovetail, as illustrated in FIG. 1, for first receiving the cooling air from the compressor. The first inlet channel 56 channels the cooling air 22 longitudinally outwardly through the turbine blade for providing internal cooling thereof, and flowing in turn through the impingement holes 48 and bridge channel 40 for discharge through both the first and second pin meshes.

Additional longitudinal flow channels or circuits in the form of second and third inlet channels 58,60 are disposed behind the nose bridge 36 and first channel 56 for cooling the airfoil to the trailing edge 30. The second and third inlet channels 58,60 also extend through the platform 14 and dovetail 16 as illustrated in FIG. 1 and have corresponding second and third inlets in the base of the dovetail for receiving portions of the pressurized cooling air 22 bled from the compressor.

The second and third inlet channels 58,60 preferably distribute their cooling air chordally aft and terminate in corresponding arrays of third and fourth mesh pins 62,64 arranged in two dimensional third and fourth grid meshes having corresponding slot outlets 66,68.

The third mesh array of pins 62 is disposed on the pressure side 24 spaced from the suction side 26 by the third inlet channel 60, and provides local cooling of the pressure side in the midchord region of the airfoil.

The fourth mesh array of pins 64 bridges the pressure and suction sides 24,26 aft of the third mesh of pins 62 and terminates before the trailing edge 30 for locally cooling the relatively thin trailing edge region of the airfoil.

In this way, the four sets of mesh cooling pins 52,54,62, 64, wrap the airfoil over most of the area of the pressure and suction sides thereof and enhance internal cooling during operation. The suction side region of the airfoil along the second inlet channel 58 in the region of maximum circumferential width of the airfoil is subject to substantially lower heat loads during operation than the leading edge, pressure side, and trailing edge of the airfoil, and therefore no mesh cooling is provided in this region in the exemplary embodiment illustrated.

The various arrays of mesh cooling pins illustrated in FIG. 2 may have any conventional configuration such as the diamond shaped pins 52,54, with the third and fourth arrays of pins 62,64 being cylindrical for example. The combination of impingement cooling and mesh cooling introduced by the thermal shield 38 provides enhanced cooling of the leading edge region of the airfoil.

The thermal shield effects a double wall configuration of the leading edge region of the airfoil and is joined to the nose bridge 36 solely by the two arrays of mesh pins 52,54. The bridge channel 40 provides thermal insulation between the thermal shield and the complementary nose bridge 36, with the two arrays of pins providing limited heat conduction paths therebetween.

The complementary convex nose bridge and concave shield at the leading edge of the airfoil reduce the distance therebetween for enhancing impingement cooling, with the spent impingement air then being used both for mesh cooling along the opposite mesh arrays of pins 52,54, as well as for providing additional film cooling through the array of showerhead film cooling holes 50 along the leading edge.

The converging bridge channel is effective for increasing the velocity of the spent impingement air as it travels along the opposite mesh pins to the corresponding first and second slot outlets 44,46 which then discharge the spent cooling air in a longitudinally continuous film of cooling air for further protecting both sides of the airfoil from the hot combustion gases which flow thereover during operation.

Another significant advantage of the thermal shield 38 and complementary bridge channel 40 is the manufacture thereof. As indicated above, turbine blades are typically manufactured by casting conventional superalloy metals in unitary or one-piece construction of the airfoil and attached platform 14 and dovetail 16 in the exemplary turbine rotor blade configuration.

Casting is effected by firstly providing ceramic cores 70 illustrated schematically in FIG. 2 which define the voids of flow channels in the finally cast airfoil. Since multiple flow channels are provided longitudinally in the airfoil, they are separately defined by corresponding casting cores or legs in a single core, or assembled together to complete the entire airfoil. The small cores are slender in the longitudinal direction since they extend the full length of the airfoil itself, with the inlet cores also extending through the platform and blade dovetail.

A particular advantage of the bridge channel 40 is its considerable extent both longitudinally along substantially the full height of the airfoil, and laterally along both sides of the airfoil. In this way, a common ceramic core may be provided for the entire bridge channel 40 and corresponding arrays of mesh pins 52,54 therein. And, three more ceramic cores may be used for the three longitudinal inlet channel 56,58,60 and the corresponding mesh channels of the latter two.

The ceramic core for the bridge channel therefore enjoys the enhanced strength due to its increased extent or size for improving yield in the casting manufacture of the airfoil. The ceramic core for the bridge channel may have maximum thickness in the bridge inlet 42 and preferentially tapers laterally along the two mesh wings.

In view of the lateral continuity of the ceramic core for the bridge channel 40, the number of rows of showerhead film cooling holes 50 may be substantially increased by eliminating some of the mesh pins 52,54 immediately adjacent to the bridge inlet 42 for increasing its lateral size and adding showerhead holes instead, or by simply adding showerhead holes between the mesh pins. This is possible due to the relatively large size of the common ceramic core for the overall bridge channel 40, as opposed to a separate and independent ceramic core configuration solely for the small bridge channel inlet 42.

The film cooling holes 50 may be formed in any conventional manner following casting of the airfoil itself, such as by using conventional laser drilling or electrical discharge machining (EDM).

The thermal shield 38 is disclosed above for thermally protecting the leading edge of the exemplary turbine rotor blade illustrated. In alternate embodiments, the thermal shield may also be introduced in a turbine nozzle vane, or other component, which is subject to impingement flow from hot combustion gases in a modern gas turbine engine. The enhanced cooling provided by the thermal shield and cooperating mesh pin arrays may be used for increasing efficiency and performance of the engine.

For example, the engine may be operated with higher combustion gas temperature to the high pressure turbine for longer periods of time during cruise operation for advanced aircraft applications. Alternatively, the improved cooling effectiveness of the thermal shield and cooperating mesh pin arrays may be used for reducing the requirement for cooling air bled from the compressor for correspondingly increasing performance of the engine.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A gas turbine airfoil comprising:
opposite pressure and suction sides joined together at chordally spaced apart leading and trailing edges and extending longitudinally from root to tip;
an outwardly convex nose bridge bridging said pressure and suction sides behind said leading edge, and integrally joined to a complementary thermally insulating shield spaced therefrom to define a bridge channel therebetween;
said shield includes said leading edge and wraps laterally aft around said nose bridge along both said pressure and suction sides;
said bridge channel includes laterally opposite slot outlets along said pressure and suction sides; and
a plurality of flow channels disposed behind said nose bridge for cooling said airfoil to said trailing edge.

2. An airfoil according to claim 1 wherein said shield is inwardly concave opposite said outwardly convex nose bridge, and said bridge channel includes a common inlet therebetween.

3. An airfoil according to claim 2 wherein said nose bridge includes a row of impingement holes directed substantially normal to said shield behind said leading edge for impingement cooling thereof.

4. An airfoil according to claim 3 wherein said shield includes a plurality of rows of film cooling holes along said leading edge for film cooling thereof.

5. An airfoil according to claim 4 further comprising an array of pins integrally joining said shield to said nose bridge, and arranged in a two dimensional mesh in said bridge channel.

6. An airfoil according to claim 5 wherein said pins are arranged in a first mesh along said pressure side from said bridge channel inlet and terminate at a first outlet of said bridge channel, and in a second mesh along said suction side from said common inlet and terminate at a second outlet of said bridge channel.

7. An airfoil according to claim 6 wherein said bridge channel converges aft between said common inlet and said first and second outlets.

8. An airfoil according to claim 7 further comprising a first inlet channel disposed behind said nose bridge for channeling cooling air thereto for flow in turn through said impingement holes and bridge channel for discharge through both said first and second pin meshes.

9. An airfoil according to claim 8 further comprising second and third inlet channels disposed behind said first inlet channel, and terminating in corresponding arrays of pins arranged in two dimensional third and fourth meshes.

10. An airfoil according to claim 9 wherein:
said third mesh array of pins is disposed on said pressure side spaced from said suction side; and
said fourth mesh array of pins bridges said pressure and suction sides aft of said third mesh and terminate before said trailing edge.

11. A gas turbine airfoil comprising:
opposite pressure and suction sides joined together at chordally spaced apart leading and trailing edges and extending longitudinally from root to tip;
an outwardly convex nose bridge bridging said pressure and suction sides behind said leading edge, and integrally joined to a complementary thermally insulating shield spaced therefrom to define a bridge channel therebetween; and
said bridge channel includes laterally opposite slot outlets along said pressure and suction sides; and
said shield includes said leading edge and wraps laterally aft around said nose bridge along both said pressure and suction sides.

12. An airfoil according to claim 11 wherein said shield is inwardly concave opposite said outwardly convex nose bridge, and said bridge channel includes a common inlet therebetween.

13. An airfoil according to claim 12 wherein said nose bridge is perforate longitudinally along said bridge channel inlet.

14. An airfoil according to claim 13 wherein said shield is perforate longitudinally along said leading edge.

15. An airfoil according to claim 14 further comprising an array of pins integrally joining said shield to said nose bridge, and arranged in a two dimensional mesh in said bridge channel.

16. An airfoil according to claim 15 wherein said pins are arranged in a first mesh along said pressure side from said bridge channel inlet and terminate at a first outlet of said bridge channel, and in a second mesh along said suction side from said common inlet and terminate at a second outlet of said bridge channel.

17. An airfoil according to claim 16 wherein said bridge channel converges aft between said common inlet and said first and second outlets.

18. An airfoil according to claim 16 wherein:
said nose bridge includes a row of impingement holes directed substantially normal to said shield behind said leading edge for impingement cooling thereof; and
said shield includes a plurality of rows of film cooling holes along said leading edge for film cooling thereof.

19. An airfoil according to claim 18 further comprising an inlet channel disposed behind said nose bridge for channeling cooling air thereto for flow in turn through said impingement holes and bridge channel for discharge through both said first and second pin meshes.

20. An airfoil according to claim 16 further comprising a plurality of flow channels disposed behind said nose bridge for cooling said airfoil to said trailing edge.

21. An airfoil according to claim 20 wherein said flow channels include corresponding second and third inlet channels terminating in corresponding arrays of pins arranged in two dimensional third and fourth meshes.

22. An airfoil according to claim 21 wherein:
said third mesh array of pins is disposed on said pressure side spaced from said suction side; and
said fourth mesh array of pins bridges said pressure and suction sides aft of said third mesh and terminate before said trailing edge.

* * * * *